United States Patent [19]

Williams et al.

[11] 4,337,900
[45] Jul. 6, 1982

[54] METHOD OF RECOVERY OF ALUMINUM FROM WASTE MATERIAL

[75] Inventors: Robert M. Williams, Ladue, Mo.; Lucian C. Bielicki, Ridgefield, Conn.

[73] Assignee: Bi-Metal Corp., White Plains, N.Y.

[21] Appl. No.: 257,463

[22] Filed: Apr. 24, 1981

Related U.S. Application Data

[63] Continuation of Ser. No. 83,573, Oct. 11, 1979, abandoned.

[51] Int. Cl.³ .............................................. B02C 19/12
[52] U.S. Cl. ........................................ 241/14; 241/24; 241/29
[58] Field of Search ....................... 241/14, 24, 27, 76, 241/29, 78, 79.1, 79, 275

[56] References Cited

U.S. PATENT DOCUMENTS

| | | | |
|---|---|---|---|
| 3,702,682 | 11/1972 | Williams | 241/79.1 X |
| 3,749,322 | 7/1933 | Reynolds | 241/24 |
| 4,119,453 | 10/1978 | Knezevich | 241/275 X |

*Primary Examiner*—Mark Rosenbaum
*Attorney, Agent, or Firm*—Gravely, Lieder & Woodruff

[57] ABSTRACT

Apparatus operable to process waste material from the usual relevant sources by breaking down such material into components so that as much of the substantially uncontaminated aluminum may be segregated for purposes of recycling, and a method for recovery of the aluminum in waste material in which the method includes a step of extracting the aluminum from the waste material by the application of magnetism.

2 Claims, 2 Drawing Figures

METHOD OF RECOVERY OF ALUMINUM FROM WASTE MATERIAL

This application is a continuation, of application Ser. No. 083,573, filed Oct. 11, 1979, now abandoned.

BACKGROUND OF THE INVENTION

It has been apparent for sometime that valuable aluminum is being wasted by being discarded with other waste material because the aluminum is not susceptible of easy recovery by the application of magnetic separators. It is recognized that aluminum used in containers is a valuable source of that metal which if recoverable can be recycled so as to reduce the amount of bauxite that is needed in the manufacture of aluminum containers.

The recovery of metal from waste material has been proposed by the use of machines like that disclosed by Vollmer U.S. Pat. Nos. 2,844,184 of July 22, 1958, or by the sorting of scrap metals as disclosed by Anderson et al 2,942,792 of June 28, 1960, or by apparatus of the character disclosed by Williams in patent 3,283,698 of Nov. 8, 1966, and further disclosed by Williams in patent 3,702,682 of Nov. 14, 1972. The main purpose for the apparatus of the prior art has been focused on the recovery of magnetic material, or in the case of the Anderson disclosure of the sorting of aluminum scrap from other metals by a method calling for gravity separation thereof in a water suspension to recover light metal portions from scrap material and melting the recovered light metal by a so called "sweating process" in which an attempt is made to selectively melt the aluminum away from metallic contamination still mixed therewith. By and large, recovery apparatus has operated on the premise that magnetically responsive waste material is economically extracted from a moving stream by passing it adjacent magnetic separating devices and allowing the non-magnetic waste to pass on by.

The disposal of waste materials of all kinds and description in the past have been carried out by dumping in landfill areas and allowing destruction thereof by natural processes. The landfill disposal has worked in a satisfactory manner for materials that will disintegrate in time, but which does not take into account the fact that aluminum does not disintegrate and is therefore a troublesome component of waste. Landfill disposal operations are fast being shut down because it is recognized that some of the waste material contains heat values, because the ferrous metals can be reused, and because the aluminum would be a valuable source for recycling processes if it could be recovered.

BRIEF DESCRIPTION OF THE INVENTION

This invention relates to apparatus and method for recovery of aluminum from waste material.

The objects of the invention are to provide apparatus which will effectively process waste material to extract ferrous components and substantially uncontaminate aluminum components, while discarding other components in the waste material.

It is also an object of the present invention to provide a unique method which will result in the recovery of a substantially increased percentage of uncontaminated aluminum from waste material.

Another object of the invention is to provide apparatus and method for achieving separation of physically attached contaminants to the scrap aluminum components of waste material, and to further afford apparatus and method for improving the quality of the aluminum scrap extracted from waste material.

A preferred embodiment of the apparatus and method includes means for treating the waste material so that it can be broken out of plastic bags and other containers in which it is originally collected, means for subjecting the waste material to a magnetic separation step in which the magnetic materials are deposited on a conveyor and a high proportion of the non-magnetic components are separated out, means for more precisely treating the magnetic components in a reduction step which further classifies the metallic components and reduces the specifically lighter components by shredding action to eliminate contaminants which may be carried off by air separation while resubjecting the shredded metallic components to a further magnetic separation step which will segregate the aluminum components in substantially uncontaminated condition.

The preferred embodiment performs a method by which magnetic components, dirt, rubble, paper, rags, plastic and the like can be efficiently separated from aluminum so as to be able to produce a product consisting of aluminum substantially free and clean of ferrous contaminants, whereby the aluminum would be acceptable for recycling and reuse in the aluminum can manufacturing operation or other commercial uses. The preferred method and apparatus will also produce a ferrous product with a minimum amount of aluminum contaminant so that at least two important metallic substances may be recovered from waste material that has been thrown away or disposed of in landfill operations.

BRIEF DESCRIPTION OF THE DRAWINGS

The apparatus which is presently preferred for practicing the foregoing invention is illustrated in the accompanying drawings, wherein.

DETAILED DESCRIPTION OF THE PREFERRED EMBODIMENT

The apparatus of the present invention has been found to produce the recovery of the ferrous metal portions reduced to small size so that it is possible to obtain a density thereof of some 70 to 90 pounds per cubic foot. The production of ferrous components at such a density makes it extremely important and economically advantageous because it can be transported to the place of reuse without paying for the movement of containers which have a high percentage of dead space and enables efficient melting and utilization in an electric furnace. It is also advantageous in the operation of the present apparatus to reduce the aluminum component to an equally dense condition and to be able to extract magnetic contaminants. It is recognized that a high percentage of the waste material is made up of all-aluminum containers which is very valuable to container manufacturers as a source of aluminum for recycling purposes. The recovery of aluminum which has been discarded will conserve a high percentage of the energy required to convert bauxite into aluminum, because the simple remelting of recycled aluminum does not consume the same amount of energy. The problem confronting those who could make use of discarded aluminum containers has been to overcome the inability to remove the aluminum mechanically and continuously in an uncontaminated condition from a stream of waste material.

Figure 1:
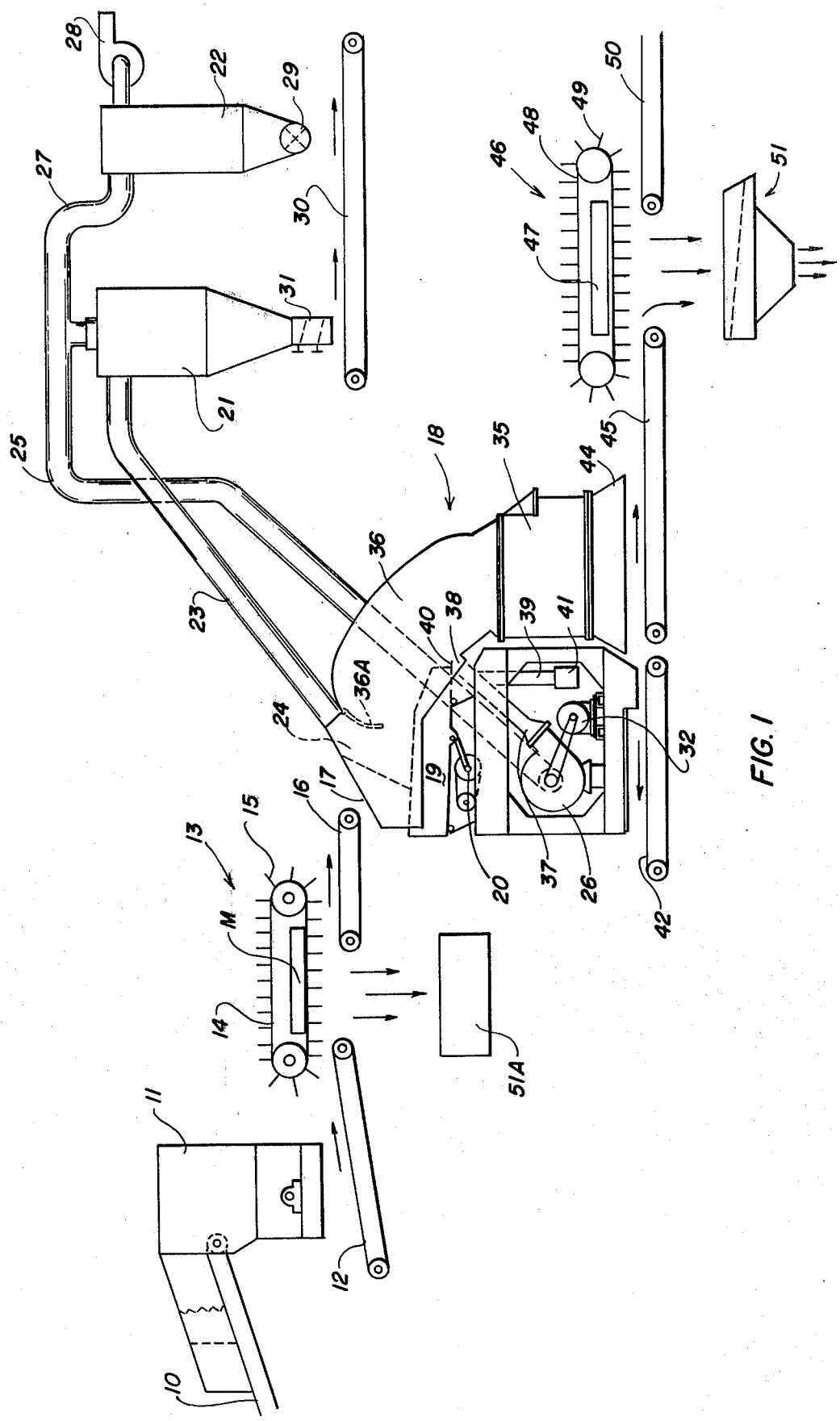
FIG. 1 is a schematic layout of apparatus suitable for putting the present invention into commercial operation.

In FIG. 1 there is shown a schematic layout of apparatus in which the waste material is brought into the system at a feed conveyor 10 and dumped into a primary shredder or trommel device 11 which functions to break up plastic bags and boxes and other containers in which the waste material may have been originally collected by packer truck pick up, or other means of collecting the waste material from multiple sources. The output of the device 11 is deposited on a conveyor 12 which moves it under a magnetic separator assembly 13 consisting of a delivering belt 14 having flights 15. The belt 14 passes just below a magnet M which causes the magnetic components brought to the assembly 13 on belt 14 to cling to the belt long enough to be moved to a position where it can be dropped onto a second conveyor 16. The gap between the conveyors 12 and 16 is provided for the purpose of allowing non-magnetic components to be gravity separated. These components may consist of wood, rubber, copper, paper, plastic, rags, food residue, stainless steel and any of the die cast materials which are contained in the waste material.

The magnetic separator assembly 13 performs a first stage classification function as between magnetic and non-magnetic components making up the total volume of the waste material. It is comtemplated that in the total volume of waste material there will be a certain percentage of tin clad steel containers with aluminum tops which will be carried over to the conveyor 16, and there will also be a certain percentage of all-aluminum containers which would normally drop by gravity in the space between conveyors 12 and 16. However, some containers have a portion which is magnetic, and they will be separated from the non-magnetic waste material and carried over to conveyor 16. It is this percentage of aluminum containers of the total volume of waste material that is one of the targets for recovery by the operation of the present apparatus.

In the past it has been generally recognized that in order to obtain a high quality, substantially contaminant free, aluminum scrap it is necessary to hand sort a stream of metallic scrap as well as to pass the stream of metallic scrap through a magnetic separating step for the purpose of removing the loose magnetic contaminants physically mixed in the scrap with the aluminum. It has not been possible to remove all ferrous contaminants from scrap aluminum where the contaminating metal is physically attached to the aluminum. The result is that in order to obtain a substantially contaminant free aluminum it has been found necessary by metallurgical procedures to melt down the scrap and recover molten aluminum from the composite scrap in order to produce a desired or acceptable purity of aluminum.

In the operation of the preferred apparatus as shown in FIG. 1 the metallics come along with contaminants that adhere thereto and are delivered into the feed opening 17 of a secondary shredder 18 so that all of the material will fall into a vibratory agitating device 19 operated by a motor driven eccentric 20. The secondary shredder 18 is connected into a flow system including a cyclone separator 21 and a baghouse 22. The cyclone separator 21 has its inlet connected by a conduit 23 to the upper chamber 24 of the shredder 18. The air outlet from the cyclone separator 21 is formed by a conduit 25 which is connected to the inlet of a blower 26 housed in the secondary shredder 18. Cyclone separator 21 also has a further air conduit 27 connected into the baghouse 22 so that a portion of the air containing a high percentage of dust and fine particles can be moved into the baghouse 22 by the action of an exhaust blower 28 which discharges the substantially clean air to the exterior while allowing the dust and dirt to be collected in the bottom of the baghouse for discharge through a rotary valve 29 onto a collection conveyor 30. It is shown that the heavy material separated out of the air stream by the cyclone separator 21 can be discharged through a flexible diaphram valve device 31 onto the same collection conveyor 30.

Figure 2:
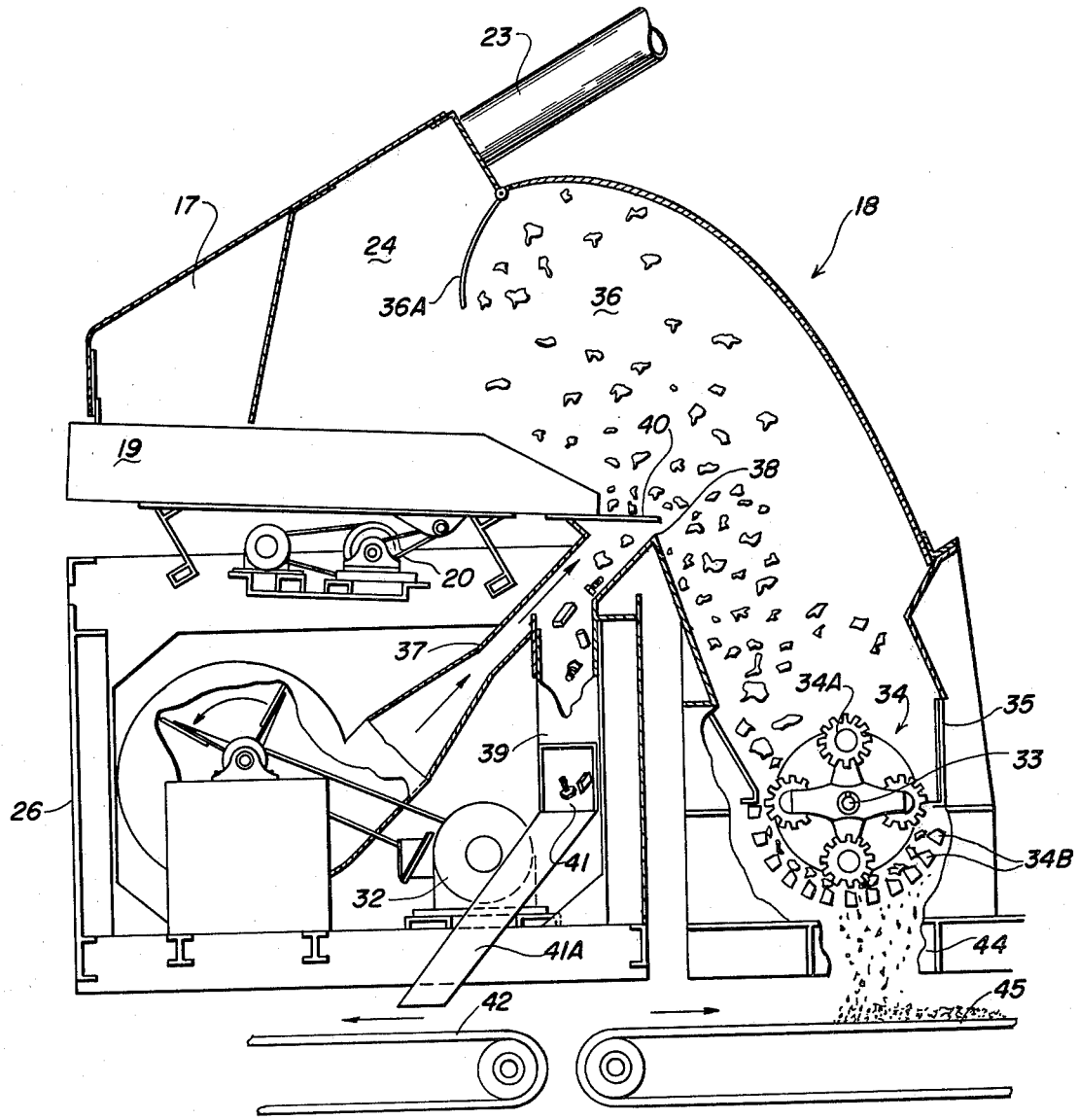
FIG. 2 is a sectional view on an enlarged scale of waste material refining apparatus embodied in the schematic layout of FIG. 1.

The secondary shredder 18 performs an important function in the method of producing at least two different classifications of metal components, and it is in this apparatus that the final preparation for recovery of aluminum occurs. Turning now to FIG. 2, it should be appreciated that the waste material delivered to the feed chamber 17 is deposited on the agitating device 19 which subjects the material to a tumbling action for the purpose of loosening dirt and paper that may have temporarily adhered itself to components. Of course, the secondary shredder must have been rendered operative by turning on the blower 26 and by energizing the motor 32 and by energizing the motor (not shown) for driving the drive shaft 33 of a hammer ring rotor 34 in the rotor housing 35. Between the rotor housing 35 and the feed chamber 17 there is an air separator chamber 36. The operation of the blower 26 moves air from the cyclone separator 21 through conduit 25 and delivers it at a substantial velocity into a conduit 37 which opens into the air separator chamber 36 at an outlet orifice 38. The conduit 37 is formed with a side opening which communicates with a trap 39 for the reception of the "heavies" which fall off the discharge end 40 formed by spaced tines of the agitator device 19 and pass through the outlet orifice 38 to fall onto a conveyor 42 through a chute 41A. Such "heavies" would consist of tramp metal that would present a crushing problem to the hammer mill and are therefore bypassed by means of the air separator.

The air delivered through the outlet orifice 38 by the blower 26 into the air separator chamber 36 creates a turbulance which will act to pick up the light fluffy components which fall off the discharge end 40 of the agitating device 19, or which are thrown out by the hammer ring rotor 34 and are moved by the suction effect in conduit 23 to the cyclone separator 21. In this manner the light fluffy material such as paper, plastic and dirt is separated out of the heavier components and moved by the air flow column in conduit 23 to the cyclone separator 21 and there eventually discharged through valve 31 to the collection conveyor 30. Movable baffle means 36A in chamber 36 is effective to redirect a certain proportion of heavier items back to the agitator 19 for further processing, while the lighter items will turn and flow into conduit 23. The components brought into a state of agitation by the device 19 are conditioned to fall into or across the stream of air issuing from the outlet orifice 38 such that the heavier components which generally are made up of the ferrous materials drop into the trap 39 and the lighter weight materials including the aluminum components pass across the outlet stream of air and are dropped into the hammer ring rotor 34 where the action of the hammer rings 34A in conjunction with the grate bars 34B will effectively shed the aluminum and roll it into balls. The hammer ring 34A will continue to shred and work the aluminum against the grate bars 34B until they are reduced to a size or densified by such action to pass through the spaces between the grate bars. During this working of the aluminum the magnetically treated tabs will be torn away from the tops and thus become separated from the rest of the aluminum. It can be seen in FIG. 2 that the working faces of the grate bars 34B are beveled in the direction of rotation of the hammer rings 34A (clockwise in this view) so that the desired rolling, balling and densifying action will occur. Thus, the grate bars provide relatively blunt surfaces to the passage of the material being worked by the hammers 34A so as to reduce the material to a size and/or density which will cause it to move in a somewhat fluid stream through the outlet 44 and be collected on a suitable belt conveyor 45.

The conveyor 45 delivers the densified components to a second magnetic separator assembly 46 which may be identical with the previously referred to assembly 13 such that a magnetic device 47 will be in a position to cause residual magnetically responsive components to cling to the belt 48 between the flights 49 until they reach a position for discharge onto a take-off conveyor 50. There is a spacing or gap between the conveyors 45 and 50 for the purpose of permitting residual non-ferrous and non-metallic components to drop free, thereby accomplishing a further purifying step which will result in a substantially aluminum free magnetic product being deposited on the conveyor 50, and a second aluminum product being dropped by gravity at the space between the conveyors 45 and 50 for treatment on a vibrating screen device 51 provided with a suitable 10 mesh screen which is adapted to allow dirt and similar particles to drop through the screen, while moving the densified aluminum product off the end of the device 51 where it may be collected in a suitable container or conveyor not shown. The dense aluminum product consists of a valuable collection of substantially contaminant free densified aluminum which is in a balled up condition suitable for melting in an electric furnace.

The foregoing specification has set forth a presently preferred embodiment of apparatus for the purpose of achieving a significant proportion of recovery of aluminum components from waste material that would normally go to landfill operations or be discarded in other ways so that the aluminum components would be forever lost. It appears from the above that waste items made up of all aluminum, or made up of aluminum with some portions of magnetic material can be easily recovered by passing all of the waste material through certain processing steps. The processing steps include an initial separating or shredding process in the device 11 so that all of the waste material deposited on the moving conveyor 12 will be loosened up and the larger components will have gone through an initial reduction to a size that would be more manageable. The waste material moved by the conveyor 12 is passed through an initial step of magnetic separation where a magnetic separator assembly 13 is effective to retain and/or extract from the flow of waste material all of the components which in one way or another are influenced by the magnet M and will thereby be moved to a second conveyor 16 for delivery into the feed side of a secondary shredder 18 which works on the lighter weight components, and particularly the aluminum components which may have been connected to magnetic material, or may have magnetic elements attached thereto, for the purpose of shredding and balling up those components. In the process of shredding and balling up the components it has been found that the aluminum is effectively torn away from and separated from the magnetic portions so that the discharge from the rotor housing 35 is deposited on a moving conveyor 45 which then passes that material through a second magnetic separation step performed by a magnetic separator assembly 46. The second magnetic separation step allows the aluminum product and dirt to fall onto a vibrating screen device 51 which acts to separate out the densified aluminum product from contaminating dirt that might have been carried along with it.

It has been found that the operation of the shredder 18 will effect segregation of the material fed to it from conveyor 16 into light weight fractions, such as paper, rags, cotton and similar items responsive to the air flow, from an intermediate weight fraction consisting of cans, wood and like items, and from the particularly heavy fractions such as bolts, nuts, solid ferrous items not easily responsive to the air flow but which might damage the hammer rings if not allowed to escape by way of trap 39. The mill will reduce the intermediate fractions thereby producing at the outlet 44 a densified flow of material containing ferrous as well as aluminum portions, and as pointed out above the product will contain aluminum substantially free from the ferrous or magnetic material since it will be torn away during the action of the hammer rings 34A and the grate bars 34B. The result is that uncontaminated aluminum can be recovered by extracting the ferrous components at the separator assembly 46.

It should be understood from the foregoing disclosure that modifications may come to mind after understanding the foregoing description and it is the intent to include such modifications within the scope of the invention.

What is claimed is:

1. A method for recovery of a substantially contaminant free grade of aluminum from a stream of waste material containing an assortment of metallic and non-metallic components, including throw away containers having an aluminum content; the method comprising: treating the waste material to a primary shredding step followed by a primary magnetic classification step to separate out non-magnetic materials; subjecting the output of the magnetic classification step to a secondary shredding and air separating step in which the output of the magnetic classification is classified essentially by weight, the secondary shredding effectively segregating the aluminum and attached magnetic components so as to shred and work the aluminum components to free it from magnetic components and densify and ball the free components into a high concentration of aluminum components separated from other components; and treating the thus densified and balled up segregated components of the classified components to a further classification step for removing magnetically responsive densified and balled up components and dirt from a high grade of densified and balled up free aluminum.

2. A method as set forth in claim 1 wherein the primary shredding step breaks up the waste material to free the components from clinging and bunching; and wherein said secondary shredding of the combined magnetic-aluminum components are freed from the aluminum portions by working the combined magnetic-aluminum components in a shredding, rolling, balling, densifying and tearing action to separate the magnetic and aluminum components from each other.

* * * * *